Figure 1:
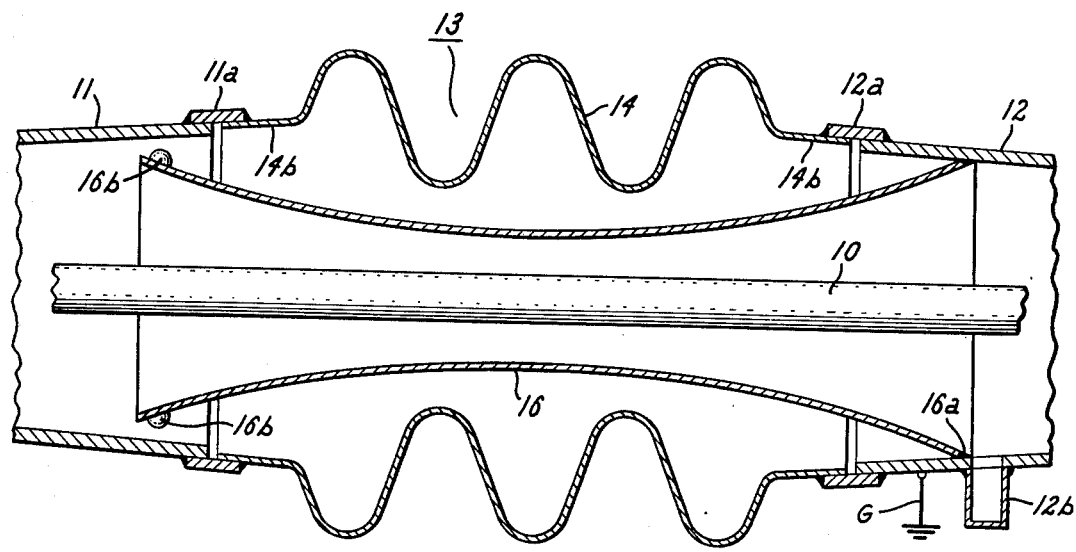

United States Patent [19]

Nakata

[11] 4,029,891
[45] June 14, 1977

[54] PARTICLE TRAPPING SHEATH COUPLING FOR ENCLOSED ELECTRIC BUS APPARATUS

[75] Inventor: Roy Nakata, Pittsfield, Mass.

[73] Assignee: General Electric Company, Philadelphia, Pa.

[22] Filed: Jan. 22, 1976

[21] Appl. No.: 651,666

[52] U.S. Cl. .............. 174/14 R; 174/13; 174/16 B; 174/99 E

[51] Int. Cl.² .......................... H01B 9/00

[58] Field of Search .......... 174/14 R, 13, 99 B, 174/99 E, 21 R, 21 C, 21 CA, 21 JC, 16 B, 28, 17 GF

[56] References Cited
UNITED STATES PATENTS

| | | | |
|---|---|---|---|
| 3,515,939 | 6/1970 | Trump | 174/14 R X |
| 3,740,925 | 6/1973 | Gothard | 174/16 B UX |
| 3,767,837 | 10/1973 | Graybill | 174/16 B X |
| 3,792,188 | 2/1974 | Cronin | 174/14 R X |
| 3,814,879 | 6/1974 | Cookson et al. | 174/14 R X |
| 3,823,249 | 7/1974 | Floessel et al. | 174/21 C |
| 3,842,147 | 10/1974 | Barkan | 174/21 C X |
| 3,856,978 | 12/1974 | Sletten et al. | 174/14 R |
| 3,895,176 | 7/1975 | Cookson et al. | 174/16 B X |

FOREIGN PATENTS OR APPLICATIONS 2,422,961  10/1975  Germany ............ 174/14 R

*Primary Examiner*—Arthur T. Grimley
*Attorney, Agent, or Firm*—William Freedman

[57] ABSTRACT

A tubular metallic sheath for horizontally disposed enclosed electric bus apparatus includes a corrugated bellows section having at one end a terminal convolution forming in internal annular recess. A sheath portion axially adjacent the recess, which may be a substantially tubular end portion of the bellows, is axially flared toward the annular recess. Within the bellows in coaxial radial spaced relation is mounted a metallic sleeve fixed at one end and axially flared toward a free end which is disposed in radial spaced relation within the oppositely flared adjacent sheath portion. The sleeve serves to shield the corrugated portion electrostatically so that the terminal convolution constitutes an effective particle trap. The bottom surfaces of the sleeve and the sheath portion adjacent its free end provide a stepped passageway for leading loose particles into the trap.

6 Claims, 6 Drawing Figures

PARTICLE TRAPPING SHEATH COUPLING FOR ENCLOSED ELECTRIC BUS APPARATUS

My invention relates to high voltage electric bus apparatus comprising a bus conductor enclosed in coaxial radially spaced relation within a sectionalized tubular metal sheath, and particularly to such apparatus wherein the sheath is disposed with its axis horizontal and filled with insulating gas under pressure. The invention is especially applicable to sectionalized bus apparatus utilized for conduction of direct current at very high voltages, as over 50,000 volts.

Electric bus apparatus of the character described, when filled with insulating gas such as sulphurhexafluoride at high pressure, has extremely high dielectric strength and is suitable for both alternating and direct current use at voltages well over 50,000 volts, as for example the range of 200,000 to 800,000 volts. At such voltages small loose solid particles, and particularly free conducting particles such as metal chips and shavings, which remain in the sheath even after careful mechanical cleaning prior to assembly, impair dielectric strength in a variety of ways. At such high voltage levels, especially in direct current applications, such particles may migrate between the grounded sheath and the enclosed high voltage conductor or may remain in a levitated or partially levitated state adjacent the conductor surfaces. Under such conditions free conducting particles randomly in motion in the insulating gas space between electrodes may cause corona, sparks, "fire flies" and field distortion which severely reduce dielectric strength in the insulating gas space. In addition, such particles tend to adhere by electrostatic action to the surfaces of supporting insulators within the sheath and thereby facilitate creepage and breakdown along the insulator surfaces. Theories underlying these actions are explained at greater length in a paper by Cronin et al entitled "Optimization of Insulators for Gas Insulated Systems", IEEE Transactions, Power Apparatus and Systems, Vol. PAS 92, No. 2, March/April 1973, pages 558-564, in a paper by Trump and Diessner, entitled "Free Conducting Particles in a Coaxial Compressed Gas Insulated System", IEEE Transactions, Power Apparatus and Systems, Vol. PAS 89, No. 8, November/December 1970, pages 1970-1978, and in U.S. Pat. No. 3,814,879-Cookson et al.

It will be apparent from the foregoing patent and technical articles that various structures have been proposed for trapping free conducting particles in enclosed, gas-filled electric bus apparatus. On such structure shown in U.S. Pat. No. 3,792,188-Cronin comprises a longitudinally corrugated enclosure providing regions of somewhat reduced electric field strength at the bottom of each relatively shallow corrugation. Cronin also discloses that initial clean-up of particles may be accomplished by the application of a high unidirectional voltage substantially lower than a high rated alternating voltage.

I have discovered that when a unidirectional voltage supplied between the electrodes of an enclosed gas insulated electric bus apparatus is sufficiently high to levitate, or lift off from the electrode surfaces, any free conducting particles in the enclosure the particles will migrate back and forth between the electrodes, reversing their charge on each contact with an electrode. It can be demonstrated that with unidirectional voltage the lift-off, or levitation, voltage is substantially the same as transit voltage. It is very difficult to trap particles continuously migrating in this manner between electrodes. It is also known that when alternating current is applied between such electrodes free conducting particles in the interelectrode space will be partially or barely levitated at a first high voltage level, but will not perform a full transit to the other electrode until a substantially higher voltage is applied. In the barely, or partially, levitated state particles are typically lifted from the surface and return toward or into reengagement with the surface repeatedly and in random manner as they dance or oscillate in a narrow region immediately adjacent the electrode surface. In my copending patent application Ser. No. 636,254 filed Nov. 28, 1975 and assigned to the same assignee as the instant application I have described and claimed an electric bus structure and particle trapping method which utilizes these characteristics to efficiently clear the main body of an enclosed electric bus apparatus of free conducting particles.

In sectionalized enclosed bus of the character described it is known to provide for thermal expansion and contraction in bus runs of substantial length by providing sliding joints in the high voltage central conductor and flexible coupling sections in the sheath. The flexible coupling sections may suitably comprise short corrugated lengths, such as a metallic bellows section, intermediate longer rigid main sections of the tubular metal sheath. The corrugations of such a bellows inherently constitute shallow particle traps within which the electric field is of reduced strength, but at very high voltage, particularly unidirectional voltage, such shallow traps are in themselves insufficient to permanently retain free conducting particles which may enter them.

Accordingly it is a principle object of my invention to provide improved means for entrapping free conducting particles within corrugated sheath sections of enclosed electric bus apparatus.

It is a more particular object of my invention to provide a flexible coupling for enclosed electric bus apparatus having improved shielding means for entrapping free conducting particles.

In carrying out my present invention in one preferred embodiment I interpose an axially convoluted flexible metal bellows between horizontal sheath sections of enclosed, gas-filled, high voltage electric bus of sectionalized construction. Adjacent one end of the bellows convolutions the sheath is provided with a tubular portion which is slightly conical or otherwise axially flared toward the proximate end convolution of the bellows. At the other end of the bellows there is mounted a coaxial tubular metal sleeve of slightly flared or conical configuration having at least a porton of its length flared toward the first end of the bellows and terminating at that end beyond the terminal bellows convolutions and within the oppositely flared sheath portion. The bottom surfaces of the flared sleeve and oppositely flared sheath portion thus provide stepped and oppositely inclined surfaces along which electrically levitated particles are led into bellows convolutions in a region electrically shielded by the internal metal sleeve.

Figure 1A:
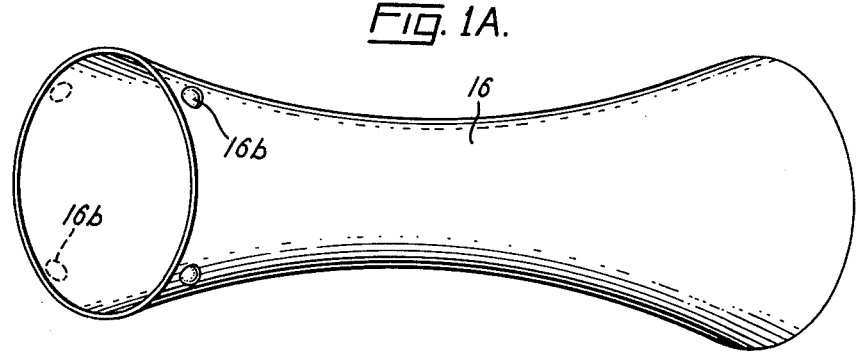
Figure 2:
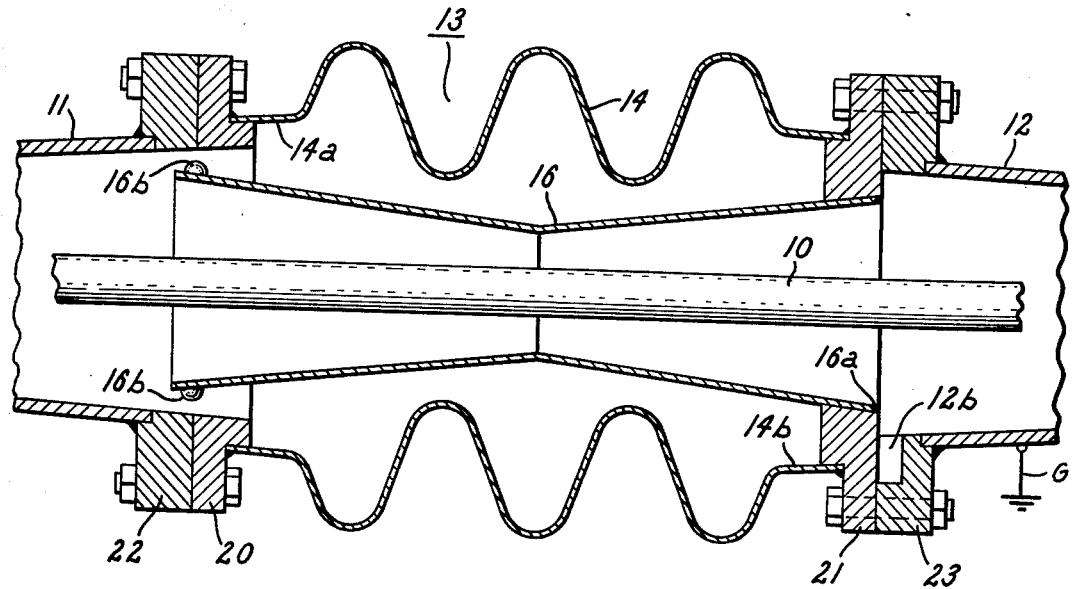
Figure 3:
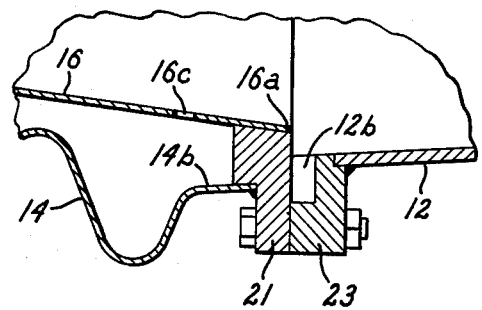
Figure 3A:
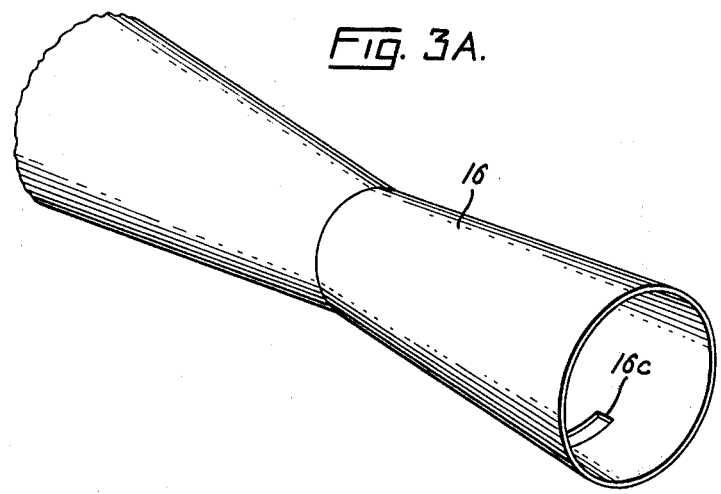
Figure 4:
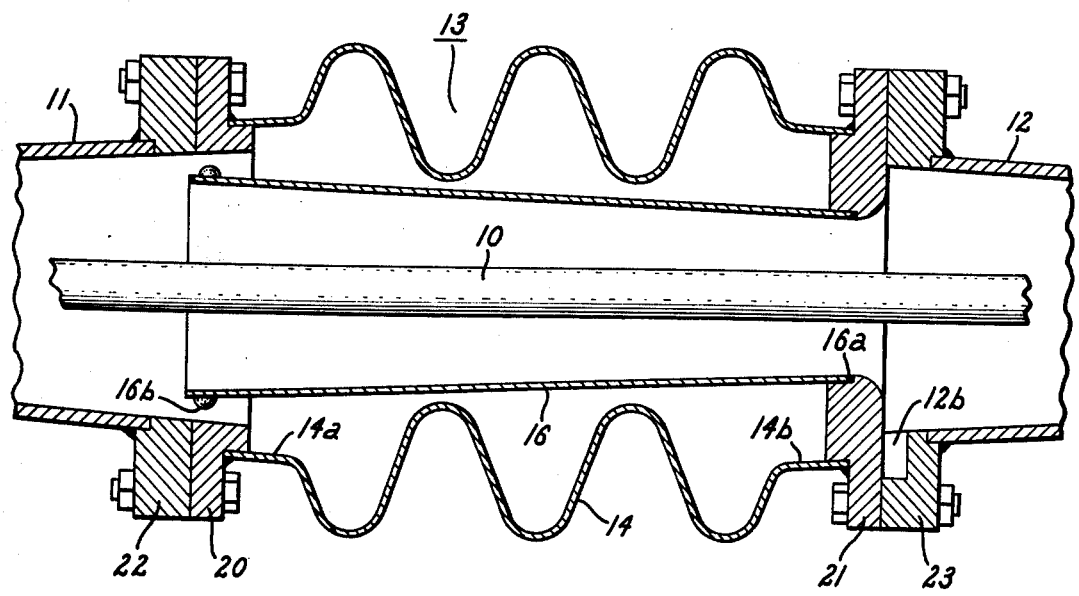

My invention will be more fully understood and its objects and advantages further appreciated by referring now to the following detailed description taken in conjunction with the accompanying drawing in which:

FIG. 1 is an axial cross sectional view of enclosed, sectionalized electric bus apparatus having a corrugated sheath section embodying my invention in one form, FIG. 1A is a perspective view of a tubular sleeve illustrated in cross section at FIG. 1, FIG. 2 is an axial cross sectional view similar to FIG. 1 showing enclosed electric bus apparatus embodying my invention in modified form, FIG. 3 is an axial cross sectional view of one end of a bus section similar to that of FIG. 2 but embodying my invention in another form, FIG. 3A is a perspective view of a tubular sleeve illustrated in fragmentary cross section at FIG. 3, and FIG. 4 is an axial cross sectional view similar to FIGS. 1 and 2 showing enclosed electric bus apparatus embodying still another modification of my invention.

Referring now to FIG. 1, I have illustrated an enclosed, sectionalized electric bus structure which is especially adapted for use with high unidirectional voltage of the order of 50,000 volts to 800,000 or more. The illustrated bus structure comprises a central high voltage conductor 10 disposed in coaxial radially spaced relation within a sectionalized tubular sheath comprising rigid metallic main sections 11, 12 and an intermediate flexible metallic section 13. The enclosing sheath 11, 12, 13 is normally maintained at ground potential, as by a grounding conductor G. As is well understood by those skilled in the art the conductor 10 may be of sectionalized construction but for simplification of disclosure such sectionalization is not illustrated in the drawing.

The flexible sheath section 13 comprises an axially corrugated metal bellows 14 having cylindrical end portions 14a, 14b and provided internally with a tubular metallic shielding sleeve 16 of conical configuration flared outwardly in both axial directions from a central waist region. The doubly conical sleeve or sheath 16 is fixedly mounted at one end within the sheath section 12 and its opposite end extends beyond the terminal convolution of bellows 14 into free radially spaced relation within the oppositely flared sheath section 11. The sleeve 16 and bellows 14, being metallic are both at ground potential.

The corrugated bellows 14 provides a convoluted bottom surface forming a plurality of axially adjacent transverse recesses or trenches and its tubular end portion 14a directly intersects the proximate transverse recess. The bellows end portions 14a, 14b are connected to the adjacent sheath sections 11, 12 by welded connecting rings 11a, 12a, respectively. Each tubular sheath section 11 and 12 is slightly flared axially toward the intermediate bellows 14. When the bus apparatus is in its intended axially horizontal position the bottom surface of the sheath 11 is thus inclined downwardly toward the bellows 14 and joined by the bellows end portion 14a to the transverse trench formed by the proximate end or terminal convolution of the bellows. As illustrated at FIG. 1 the bellows end portion 14a intersects the proximate terminal convolution of the bellows at a transverse section where the bellows convolution is of less than its maximum diameter and increases in diameter in an axial direction proceeding toward the center of the bellows. As this description proceeds it will be evident that the end portion 14a may so intersect the proximate terminal bellows convolution at any desired section of minimum or intermediate diameter (i.e., terminates adjacent a bellows recess).

The tubular metallic sleeve 16 shwon at FIG. 1 is of slightly less diameter in its central region that the minimum diameter of the bellows convolutions and is of double conical or like configuration, flaring slightly radially outward toward each end from an intermediate waist region of minimum cross section.

The sleeve 16, open at both ends, is positioned concentrically within the bellows section 13 and preferably extends slightly beyond each end into the adjacent conical sheath sections 11, 12. At one end the sleeve 16 is fixedly mounted, as by welding, at 16a, to the sheath section 12. Immediately adjacent the fixed end of sleeve 16 the sheath section 12 is provided in its bottom surface with a deep transverse arcuate trench or recess 12b for trapping of loose metl particles. The opposite open end of sleeve 16 is positioned in radially spaced relation within the sheath section 11. Preferably a plurality of projections or buttons 16b are provided on the external surface of sleeve 16 at this end in order to prevent direct engagement of the sleeve 16 with sheath section 11. FIG. 1A is a perspective view of the sleeve 16 showing four such buttons. Preferably the buttons are of insulating material such as polyurethane, Teflon (Polytetraflouroethylene) or the like.

It will now be observed that in the flexible tubular bus sheath section 13 substantially no electric field stress exists in the annular region between the bellows 14 and shielding sleeve 16. This is due to the fact that the metal sleeve 16 is electrically connected at one end to the sheath position 12 and through it to the metal bellows. When this bus structure is disposed with its axis horizontal the bottom surface of the doubly shielding sleeve 16 is inclined downwardly in one axial direction toward the deep trench-like particle trap 12b at the fixed end of the sleeve and is inclined downwardly in the opposite direction toward the reversely inclined bottom surface of the sheath portion 11 at the free end of the sleeve. The bottom surface of sheath part 11 is inclined downwardly toward the proximate terminal bellows convolution, and the bottom surface of sheath part 12 is inclined downwardly toward the trap 12b.

It will also be evident to those skilled in the art that the smoothly contoured shielding sleeve 16 serves not only to reduce electric stress between the shield and bellows but also eliminates any high stress regions within the shield. Without such shield the radially inner bellows convolutions would distort the field to form high stress regions.

In operation, when a high alternating voltage sufficient to levitate, but not transport, free conducting particles within the sheath is applied between the high voltage central conductor 10 and the grounded metal sheath 11, 12, 13 free conducting particles which exist within the sleeve 16 progress downwardly along the inclined surfaces of the sleeve toward its opposite ends and fall either into the trap 12b or upon the reversely inclined bottom surface of sheath portion 11. Particles falling upon the part 11 move along its inclined bottom surface and the bellows end 14a into the trapping trench formed by the bottom of the proximate terminal bellows corrugation and there come the rest in a region of substantially zero electric field strength. Any free particles which may exist in the annular region between the bellows 14 and sleeve 16 fall by gravity into the bottom of the bellows where no field exists to lift them out.

FIG. 2 illustrates an embodiment of my invention similar to that illustrated at FIG. 1 and like parts have been assigned the same reference numerals. In FIG. 2 the sleeve 16 comprises two oppositely flared rectiliner conical portions and terminates at its free end within an oppositely flared end portion 14a of the bellows. The bellows ends 14a, 14b are welded to flanges 20, 21 and the adjacent sheath portions 11, 12, respectively, are provided with flanges 22, 23. Adjacent flanges at opposite ends of the bellows are bolted together. At the fixed end of sleeve 16 it overlies and it welded to the bellows end flange 21 and the adjacent flange 23 is arcuately recessed at the bottom to form the trap 12b. While at FIG. 2 the sheath portion 11 is shown conically flared in the same direction as the end 14a of bellows 14 it will be understood that if the bellows end 14a is flared oppositely to the direction of flare of sleeve 16 the adjacent sheath section 11 need not be flared in the direction indicated at FIG. 2.

At FIG. 3 I have shown the fixed end only of a bellows 14 and sleeve 16 with the sleeve having an arcuate aperture 16C in its bottom wall over or near the annular trench formed by the terminal bellows convolution at that end. In this case it is desirable but not necessary that the bellows end portion 14b be at least slightly conical and flared toward the terminal convolution. FIG. 3A shows a perspective view of the slotted sleeve 16. In the embodiment of FIGS. 3, 3A conducting particles which move along the sleeve 16 toward its fixed end fall through the arcuate slot 16C and into the proximate first bellows convolution beneath the sleeve. As illustrated at FIG. 3 the structure is otherwise as shown at FIG. 2, but it will be understood by those skilled in the art that a sleeve so slotted at its fixed end may be used with other mounting and coupling structures such as that shown at FIG. 1.

FIG. 4 shows a bellows section of enclosed bus sheath generally similar to that shown at FIG. 2 and like parts have been assigned the same reference numerals. In FIG. 4 however, the sleeve 16 is conically flared in only one direction from a section of minimum cross section at its fixed end to a section of maximum cross section at its free end.

In the various embodiments of my invention described above I have described the shielding sleeve 16 as of conical or double conical configuration and have described the sheath portions 11, 12 and bellows ends 14a, 14b as conical in some embodiments. It will be understood by those skilled in the art that in order to accomplish the random progression of free conducting particles in a barely levitated state, only very slight inclination of the sheath bottom surface is required. Therefore in a sheath with its axis horizontal the angle between the surface elements of any conical section and the conical axis need be of the order only of 2° to 5° but may be greater if desired. Space considerations usually make it impractical to utilize an angle of greater than 20°. It will also be understood by those skilled in the art that, while my description of certain sheath portions as "conical" ordinarily imports circular cross section the invention is equally applicable to bus sheath structures of other cross sectional configuration, such as rectangular, eliptical, or the like. It is only necessary that the internal bottom surfaces of the sheath be inclined as described; such inclination in a tubular sheath with its axis horizontal may be defined more generally in terms of spaced apart vertical cross sectional axes of minimum and maximum length, as in the claims appended hereto.

While I have thus described by way of illustration only certain preferred embodiments of my invention, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In high voltage electric bus apparatus adapted for disposition with its longitudinal axis substantially horizontal, a tubular metallic sheath having an axially corrugated portion including at one end a terminal convolution forming an internal annular recess in said sheath and an adjacent portion axially flared toward said annular recess, said flared adjacent portion having its maximum vertical cross sectional axis proximate said recess and its minimum vertical cross sectional axis remote, and a tapered tubular sleeve of electrically conductive material fixedly mounted within said sheath adjacent the other end of said corrugated portion and extending through said corrugated portion in coaxial radially spaced relation, at least a portion of said sleeve axially flared toward a free end positioned in radially spaced relation, within said adjacent sheath portion, whereby said sleeve electrostatically shields said corrugated portion and said annular recess forms an electrostatic trap for free conductive particles within said sheath, said oppositely flared sleeve and adjacent sheath portion providing stepped and oppositely inclined bottom surfaces adapted to direct electrically levitated particles into said trap.

2. A tubular sheath for electric bus apparatus according to claim 1 wherein said sleeve is axially flared from a intermediate waist region toward both ends and said sheath includes a transverse internal trench forming an electrostatic trap adjacent the fixed end of said sleeve.

3. A tubular sheath for electric bus apparatus according to claim 1 wherein said sleeve is unidirectionally flared for substantially its entire length from said fixed end toward said free end.

4. A tubular sheath for electric bus apparatus according to claim 1 wherein said sleeve is flared from an intermediate waist region toward both ends and is slotted transversely across its bottom wall above said corrugated portion and adjacent the fixed end of said sleeve.

5. A tubular sheath for electric bus apparatus according to claim 2 wherein a sheath portion adjacent the fixed end of said corrugated portion and beyond said sleeve is axially flared toward said transverse trench.

6. A tubular sheath for electric bus apparatus according to claim 1 wherein said corrugated portion comprises a metallic bellows having an inwardly flared tubular end portion integral with said terminal convolution.

* * * * *